United States Patent
Yin et al.

(10) Patent No.: US 10,903,651 B2
(45) Date of Patent: Jan. 26, 2021

(54) POWER GRID ADJUSTMENT METHOD BASED ON LOADS OF VARIABLE FREQUENCY AIR CONDITIONER

(71) Applicants: STATE GRID JIANGSU ELECTRIC POWER CO., LTD, Jiangsu (CN); STATE GRID JIANGSU ELECTRIC POWER CO., LTD. NANJING POWER SUPPLY BRANCH, Jiangsu (CN); CHINA ELECTRIC POWER RESEARCH INSTITUTE COMPANY LIMITED, Beijing (CN); HOHAI UNIVERSITY, Jiangsu (CN)

(72) Inventors: Jijun Yin, Jiangsu (CN); Gang Chen, Jiangsu (CN); Xiao Lu, Jiangsu (CN); Yaohong Li, Jiangsu (CN); Qifeng Huang, Jiangsu (CN); Shufeng Lu, Jiangsu (CN); Bin Yang, Jiangsu (CN); Feng Ye, Jiangsu (CN); Haowei Zhang, Jiangsu (CN); Xiao Chen, Jiangsu (CN); Qiang Zhou, Jiangsu (CN); Mingfeng Xue, Jiangsu (CN); Lingying Huang, Jiangsu (CN); Shihai Yang, Jiangsu (CN); Qingshan Xu, Jiangsu (CN); Minrui Xu, Jiangsu (CN); Zhixin Li, Jiangsu (CN); Shuangshuang Zhao, Jiangsu (CN); Feng Wang, Jiangsu (CN); Wenguang Chen, Jiangsu (CN)

(73) Assignees: STATE GRID JIANGSU ELECTRIC POWER CO., LTD; STATE GRID CORPORATION OF CHINA; STATE GRID JIANGSU ELECTRIC POWER COMPANY RESEARCH INSTITUTE; SOUTHEAST UNIVERSITY

( * ) Notice: Subject to any disclaimer, the term of this patent is extended or adjusted under 35 U.S.C. 154(b) by 0 days.

(21) Appl. No.: 16/365,877

(22) Filed: Mar. 27, 2019

(65) Prior Publication Data
US 2019/0305555 A1   Oct. 3, 2019

(30) Foreign Application Priority Data

Mar. 28, 2018 (CN) .......................... 2018 1 0262888
Feb. 2, 2019 (CN) .......................... 2019 1 0107263

(51) Int. Cl.
*H02J 3/14* (2006.01)
*G06Q 50/06* (2012.01)
(Continued)

(52) U.S. Cl.
CPC ............... *H02J 3/14* (2013.01); *G06Q 50/06* (2013.01); *H02P 9/42* (2013.01); *H02P 21/0003* (2013.01); *Y02E 40/50* (2013.01)

(58) Field of Classification Search
CPC ....................................................... H02J 3/26
See application file for complete search history.

(56) References Cited

U.S. PATENT DOCUMENTS

2010/0079922 A1* 4/2010 Blakely ................... H02H 1/06
                                                              361/87
2011/0276180 A1* 11/2011 Seem .................. G05B 13/0265
                                                             700/275
(Continued)

FOREIGN PATENT DOCUMENTS

CN    104953686 A    9/2015
CN    105958552 A    9/2016
(Continued)

OTHER PUBLICATIONS

F.O, Enemuoh, "Modelling, Simulation and performance analysis of a variable frequency drive in speed control of induction motor", Dec. 2013 (Year: 2013).*

(Continued)

*Primary Examiner* — Nathan L Laughlin
(74) *Attorney, Agent, or Firm* — McDonald Hopkins LLC

(57) ABSTRACT

Provided is a power grid adjustment method based on a load of a variable frequency air conditioner. The method includes: establishing a mathematical simulation model of a virtual synchronous motor in a variable frequency air con-
(Continued)

ditioner controller; establishing a virtual inertia control segment and a droop control segment of power grid adjustment according to the mathematical simulation model; obtaining a reference value $\Delta\omega$ of rotation speed variation of a compressor by the virtual inertia control segment; obtaining a reference value $\omega_{ref}$ of rotational angular frequency of the compressor by the droop control segment; and inputting a sum of the reference value $\omega_{ref}$ of rotational angular frequency of the compressor and the reference value $\Delta\omega$ of rotation speed variation of the compressor into a field-oriented controller (FOC) to control rotation of a motor.

19 Claims, 5 Drawing Sheets

(51) Int. Cl.
*H02P 9/42* (2006.01)
*H02P 21/00* (2016.01)

(56) References Cited

U.S. PATENT DOCUMENTS

| | | | |
|---|---|---|---|
| 2015/0123623 | A1 | 5/2015 | Gulen et al. |
| 2016/0040350 | A1* | 2/2016 | Xu .................. D06F 5/206 34/443 |
| 2019/0368797 | A1* | 12/2019 | Tsukii .................. F25B 49/025 |

FOREIGN PATENT DOCUMENTS

| | | |
|---|---|---|
| CN | 106972544 A | 7/2017 |
| CN | 108418214 A | 8/2018 |

OTHER PUBLICATIONS

International Search Report dated Jun. 12, 2019; International Patent Application No. PCT/CN2019/077319.

* cited by examiner

POWER GRID ADJUSTMENT METHOD BASED ON LOADS OF VARIABLE FREQUENCY AIR CONDITIONER

CROSS-REFERENCE TO RELATED APPLICATIONS

This application claims priority to Chinese patent applications No. 201810262888.4 filed on Mar. 28, 2018 and No. 201910107263.5 field on Feb. 2, 2019, disclosure of which is incorporated herein by reference in its entirety.

TECHNICAL FIELD

Embodiments of the present disclosure relate to the technical field of a demand side response (DSR) of a power grid, and particularly relate to a power grid adjustment method based on a load of a variable frequency air conditioner.

BACKGROUND

With access of more and more wind and photovoltaic power generation and electric vehicles, a randomness of power supplies and loads in the power grid is greatly increased so that traditional means for frequency modulation and peak regulation cannot meet demands. Meanwhile, the development of an Internet of Things (IOT) technology and a smart home technology gives a two-way communication capacity to the power grid and the loads. Therefore, a DSR is regarded as one of the most promising means for frequency modulation in the future.

In many controllable loads, a load of an air conditioner, especially a load of a central air conditioner, has a greatest potential to participate in the peak regulation and the frequency modulation. Firstly, the electricity consumption of air-conditioner loads in a city is huge and may account for 30%-40% of a peak load at the peak of electricity consumption. Secondly, a closed building space has relatively strong heat and cold storage capacities so that a comfort level of users will not be affected when adjusting the power of the air conditioner in a short time. Thirdly, a response speed of the load of the air conditioner mainly depends on transmission of a control signal, and test results of an existing engineering indicate that the response speed meets requirements of the frequency modulation and peak regulation.

SUMMARY

The present disclosure provides a power grid adjustment method based on a load of a variable frequency air conditioner, so as to solve a problem of insufficient moment of inertia of the power grid caused after a new energy resource accesses to the power grid. A control strategy for the load of the variable frequency air conditioner may be optimized by using the DSR of the power grid, the moment of inertia of a microgrid may be improved, and a fluctuation range of an alternating current (AC) frequency may be reduced when the load fluctuates.

In a first aspect, embodiments of the present disclosure provide a power grid adjustment method based on a load of a variable frequency air conditioner, including:

establishing a mathematical simulation model of a virtual synchronous motor in the variable frequency air conditioner controller;

establishing a virtual inertia control segment and a droop control segment of power grid adjustment according to the mathematical simulation model;

obtaining a reference value $\Delta\omega$ of a rotation speed variation of a compressor by the virtual inertia control segment;

obtaining a reference value $\omega_{ref}$ of rotational angular frequency of the compressor by the droop control segment; and inputting a sum of the reference value $\omega_{ref}$ of rotational angular frequency of the compressor and the reference value $\Delta\omega$ of rotation speed variation of the compressor into a field-oriented controller (FOC) to control rotation of a motor.

In an embodiment, the power grid adjustment method further includes:

establishing a signal model of the virtual synchronous motor, and obtaining a cutoff frequency $\omega$ of each variable frequency air conditioner;

acquiring a phase margin (PM) of the virtual synchronous motor, and calculating a moment of inertia J of the virtual synchronous motor according to the PM and the cutoff frequency $\omega$ of the variable frequency air conditioner; and obtaining a maximum value of the moment of inertia J of the virtual synchronous motor according to a value range of the PM.

In an embodiment, the mathematical simulation model is $$\begin{cases} J\dfrac{d\Delta\omega_{sg}}{dt} = \dfrac{-K_D\Delta\omega_{sg} - \Delta P_{sg}}{\omega_N} \\ \Delta\delta = \int (\Delta\omega_{sg} - \Delta\omega_g)dt \end{cases}$$

Where $\Delta\omega_{sg}$ is an angular frequency disturbance quantity of the virtual synchronous motor, $\Delta\omega_g$ is an angular frequency disturbance quantity of a voltage of the power grid, $K_D$ is a droop coefficient, $\omega_N$ is a rated rotation speed, $\Delta\delta$ is a power angle disturbance quantity, and $\Delta P_{sg}$ is a power disturbance quantity.

In an embodiment, a step of obtaining the reference value $\Delta\omega$ of rotation speed variation of the compressor by the virtual inertia control segment includes:

acquiring the voltage $U_g$ of the power grid, generating a virtual voltage orthogonal to the voltage of the power grid by a differential method, forming an $\alpha\beta$ static orthogonal coordinate system, and performing Park transformation with a phase angle $\theta_v$ of a virtual electromotive force vector of the virtual synchronous motor to obtain components of the voltage of the power grid relative to $V_d$ and $V_q$, where a power angle $\delta_v$ of the virtual synchronous motor is:

$$\delta_v = \arctan(V_q/V_d).$$

A virtual power $P_v$ of the virtual synchronous motor is:

$$P_v = \frac{U_g E}{X_a}\sin\delta_v \approx \frac{U_g E}{X_a}\delta_v.$$

The reference value $\Delta\omega$ of rotation speed variation of the compressor is:

$$\Delta\omega = \frac{1}{n}\Delta P_v.$$

Wherein $U_g$ is the voltage of the power grid; E is the virtual electromotive force, $X_a$ is a virtual reactance, n is a constant, and $\Delta P_v$ is the amount of power consumption variation.

In an embodiment, a step of obtaining the reference value $\omega_{ref}$ of rotational angular frequency of the compressor by the droop control segment includes:

acquiring a constant operating power $P_N$ of the variable frequency air conditioner according to a set temperature of the variable frequency air conditioner and an indoor temperature, and calculating by a formula $P_D = P_N + K_D(\omega_N - \omega_g)$ to obtain a steady-state output power $P_D$ of the variable frequency air conditioner, where $\omega_g$ is an angular frequency of the voltage of the power grid, and $K_D$ is a droop coefficient of the power grid; and inputting a difference between an actually measured power of the variable frequency air conditioner and the steady-state output power $P_D$ of the variable frequency air conditioner into a PI controller to obtain the reference value $\omega_{ref}$ of rotational angular frequency of the compressor.

In an embodiment, a step of obtaining the reference value $\omega_{ref}$ of rotational angular frequency of the compressor by the droop control segment further includes:

setting a range of the power of the variable frequency air conditioner as $\{0, P_{max}\}$, then an adjustable range of the power is $P_N \pm \min\{(P_{max} - P_N), PN\}$ during a frequency modulation of the power grid, and $P_{max}$ is a maximum power of the variable frequency air conditioner, and the power of the variable frequency air conditioner reaches an upper limit when a frequency error is 0.3 Hz; and calculating the droop coefficient $K_D$ of the power grid by a formula:

$$K_D = \frac{0.8 \min\{(P_{max} - P_N), P_N\}}{0.3 \times 2\pi}.$$

In an embodiment, the power grid adjustment method further includes:

$$\omega_c = \sqrt{\sqrt{\frac{K_p^2}{J^2 \omega_N^2} + \frac{K_D^4}{4J^4}} - \frac{K_D^4}{2J^2}}, \omega_c \le \frac{K_p}{\omega_N K_D},$$

obtaining the cutoff frequency $\omega_c$ of each variable frequency air conditioner by the above formula, where $K_p$ is a constant;

$$PM = 180° + \angle T_p(\omega_c) = 90° - \arctan\left(\frac{\omega_c J}{K_D}\right)$$

calculating to obtain a maximum value of the moment of inertia J according to the formula of the PM when the PM is in the range of 30° to 50°, wherein $\angle T_p(\omega_c)$ is a loop gain amplitude of a virtual inertia stage.

In an embodiment, a step of inputting the sum of the reference value $\omega_{ref}$ of the rotational angular frequency of the compressor and the reference value $\Delta\omega$ of rotation speed variation of the compressor into the FOC to control the rotation of the motor includes:

collecting two-phase currents $i_a$ and $i_b$;

performing clarke transformation on the two-phase currents $i_a$ and $i_b$ to obtain magnitudes of two-axis orthogonal currents $i_\alpha$ and $i_\beta$;

performing rotation transformation on the orthogonal current magnitudes $i_\alpha$ and $i_\beta$ to obtain orthogonal current magnitudes $i_d$ and $i_q$, where $i_q$ is related to a torque, and $i_d$ is related to a magnetic flux;

inputting the obtained $i_d$ and $i_q$ respectively into the PI controller to obtain corresponding outputs $v_d$ and $v_q$;

obtaining a rotation angle θ of the motor by a sensor, and performing an inverse park transformation with $v_d$ and $v_q$ to obtain magnitudes of two-axis currents $v_\alpha$ and $v_\beta$; and performing an inverse clarke transformation on $v_\alpha$ and $v_\beta$ to obtain a required three-phase voltage, and inputting the three-phase voltage to an inverter bridge to drive the motor to rotate.

In a second aspect, embodiments of the present disclosure further provide a power grid adjustment method based on a load of a variable frequency air conditioner, including:

establishing a mathematical simulation model of a virtual synchronous motor of a variable frequency air conditioner;

establishing an adjustment structure of the virtual synchronous motor according to the mathematical simulation model of the virtual synchronous motor;

acquiring parameters of a power grid in real time;

inputting the parameters of the power grid into the adjustment structure for calculation to obtain a reference value $\Delta\omega$ of a rotation speed variation of the variable frequency air conditioner and a reference value $\omega_{ref}$ of a rotational angular frequency which is needed to be changed; and adjusting a working point of the variable frequency air conditioner according to the reference value $\Delta\omega$ of the rotation speed variation of the variable frequency air conditioner and the reference value $\omega_{ref}$ of the rotational angular frequency.

In an embodiment, before the step of establishing the mathematical simulation model of the virtual synchronous motor of the variable frequency air conditioner, the method further includes:

establishing a signal model of the virtual synchronous motor, and obtaining a cutoff frequency $\omega_c$ of each variable frequency air conditioner;

acquiring a phase margin (PM) of the virtual synchronous motor, and calculating a moment of inertia J of the virtual synchronous motor according to the PM and the cutoff frequency $\omega_c$ of the variable frequency air conditioner; and obtaining a maximum value of the moment of inertia J of the virtual synchronous motor according to a value range of the PM.

In an embodiment, the mathematical simulation model is:

$$\begin{cases} J\dfrac{d\Delta\omega_{sg}}{dt} = \dfrac{-K_D \Delta\omega_{sg} - \Delta P_{sg}}{\omega_N} \\ \Delta\delta = \int (\Delta\omega_{sg} - \Delta\omega_g) dt \end{cases}.$$

Where $\Delta\omega_{sg}$ is an angular frequency disturbance quantity of the virtual synchronous motor, $\Delta\omega_g$ is the angular frequency disturbance quantity of a voltage of the power grid, $K_D$ is a droop coefficient, $\omega_N$ is a rated rotation speed, $\Delta\delta$ is a power angle disturbance quantity, $\Delta P_{sg}$ is a power disturbance quantity, and J is the moment of inertia of the virtual synchronous motor.

In an embodiment, the adjustment structure includes a virtual inertia control segment and a droop control segment, and the step of establishing the adjustment structure of the virtual synchronous motor according to the mathematical simulation model of the virtual synchronous motor includes:

determining an inertia adjustment proportion parameter of the virtual inertia control segment and a droop adjustment proportion parameter of the droop control segment according to the mathematical simulation model of the virtual synchronous motor.

In an embodiment, a step of inputting the parameters of the power grid into the adjustment structure for calculation to obtain the reference value $\Delta\omega$ of the rotation speed variation of the variable frequency air conditioner and the reference value $\omega_{ref}$ of the rotational angular frequency which is needed to be changed includes:

inputting a voltage of the power grid into the virtual inertia control segment for calculation to obtain the reference value $\Delta\omega$ of rotation speed variation of the variable frequency air conditioner; and inputting a frequency of the power grid into the droop control segment for calculation to obtain the reference value $\omega_{ref}$ of rotational angular frequency which is needed to be changed.

In an embodiment, the step of inputting the voltage of the power grid into the virtual inertia control segment for calculation to obtain the reference value $\Delta\omega$ of the rotation speed variation of the variable frequency air conditioner includes:

acquiring the voltage $U_g$ of the power grid and generating a virtual voltage orthogonal to the voltage of the power grid by a differential method to form an $\alpha\beta$ static orthogonal coordinate system, and performing park transformation with a phase angle $\theta_v$ of a virtual electromotive force vector of the virtual synchronous motor to obtain components of the voltage of the power grid relative to $V_d$ and $V_q$, where a power angle $\delta_v$ of the virtual synchronous motor is $$\delta_v = \arctan(V_q/V_d).$$

A virtual power $P_v$ of the virtual synchronous motor is:

$$P_v = \frac{U_g E}{X_a}\sin\delta_v \approx \frac{U_g E}{X_a}\delta_v.$$

The reference value $\Delta\omega$ of rotation speed variation of the compressor is:

$$\Delta\omega = \frac{1}{n}\Delta P_v.$$

Where $U_g$ is the voltage of the power grid; E is the virtual electromotive force, $X_a$ is a virtual reactance, n is a constant, and $\Delta P_v$ is the amount of power consumption variation.

In an embodiment, the step of inputting the frequency of the power grid into the droop control segment for calculation to obtain the reference value $\omega_{ref}$ of the rotational angular frequency which is needed to be changed includes:

acquiring a constant operating power $P_N$ of the variable frequency air conditioner according to a set temperature of the variable frequency air conditioner and an indoor temperature, and calculating by a formula $P_D = P_N \pm K_D(\omega_N - \omega_g)$ to obtain a steady-state output power $P_D$ of the variable frequency air conditioner, where $\omega_g$ is an angular frequency of the voltage of the power grid, and $K_D$ is a droop coefficient of the power grid; and inputting a difference between an actually measured power of the variable frequency air conditioner and the steady-state output power $P_D$ of the variable frequency air conditioner into a PI controller to obtain the reference value $\omega_{ref}$ of the rotational angular frequency of a compressor.

In an embodiment, before inputting the frequency of the power grid into the droop control segment for calculation to obtain the reference value $\omega_{ref}$ of the rotational angular frequency which is needed to be changed, the method further includes: acquiring the droop coefficient of the droop control segment; the droop coefficient $K_D$ is:

$$K_D = \frac{0.8\ \min\{(P_{max} - P_N), P_N\}}{0.3 \times 2\pi}.$$

Where $P_{max}$ is a maximum power of the variable frequency air conditioner, $P_N$ is a rated power of the variable frequency air conditioner, and an adjustable range of the power of the variable frequency air conditioner is $P_N \pm \min\{(P_{max} - P_N), P_N\}$.

In an embodiment, the cutoff frequency $\omega_c$ of the variable frequency air conditioner is:

$$\omega_c = \sqrt{\sqrt{\frac{K_p^2}{J^2\omega_N^2} + \frac{K_D^4}{4J^4}} - \frac{K_D^2}{2J^2}},\ \omega_2 \le \frac{K_p}{\omega_N K_D},$$

where $K_p$ is a constant.

In an embodiment, a relationship between a value range of the PM and the maximum value of the moment of inertia J of the virtual synchronous motor is $$PM = 180° + \angle T_p(\omega_c) = 90° - \arctan\left(\frac{\omega_c J}{K_D}\right).$$

wherein PM is the phase margin, and $\angle T_p(\omega_c)$ is a loop gain amplitude of a virtual inertia stage.

In an embodiment, the step of adjusting the working point of the variable frequency air conditioner according to the reference value $\Delta\omega$ of the rotation speed variation of the variable frequency air conditioner and the reference value $\omega_{ref}$ of the rotational angular frequency includes:

collecting two-phase currents $i_a$ and $i_b$ of the variable frequency air conditioner;

performing clarke transformation on the two-phase currents $i_a$ and $i_b$ to obtain magnitudes of two-axis orthogonal currents $i_\alpha$ and $i_\beta$;

performing rotation transformation on the magnitudes of the orthogonal currents $i_\alpha$ and $i_\beta$ to obtain orthogonal current magnitudes $i_d$ and $i_q$, where, $i_q$ is related to a torque, and $i_d$ is related to a magnetic flux;

inputting the obtained $i_d$ and $i_q$ respectively into the PI controller to obtain corresponding outputs $v_d$ and $v_q$;

obtaining a rotation angle $\theta$ of the motor of the variable frequency air conditioner by a sensor, and performing an inverse park transformation with $v_d$ and $v_q$ to obtain magnitudes of two-axis currents $v_\alpha$ and $v_\beta$; and performing an inverse clarke transformation on $v_\alpha$ and $v_\beta$ to obtain a required three-phase voltage, and inputting the three-phase voltage to an inverter bridge to drive the variable frequency air conditioner to work.

According to a technical solution of the present disclosure, the output power of the variable frequency air conditioner can simulate variation processes of the output power and the rotation speed of a no-load synchronous motor with the same capacity by establishing the mathematical simulation model of the virtual synchronous motor when the frequency of the power grid fluctuates. The technical solution can be adopted to solve the problem of insufficient moment of inertia of the power grid caused after accessing a new energy source to the power grid, improve the moment of inertia of the microgrid, and reduce the fluctuation range of AC frequency when the load fluctuates.

DETAILED DESCRIPTION

The present disclosure will be further described below in detail in combination with drawings and embodiments. It can be understood that specific embodiments described herein are only used for explaining the present disclosure, not used for limiting the present disclosure. In addition, it shall be illustrated that for ease of description, drawings only show some structures related to the present disclosure rather than all structures.

In view of a problem of insufficient moment of inertia of a power grid caused after a new energy resource is accessed to the power grid, the present disclosure provides a power grid adjustment method based on a load of a variable frequency air conditioner by optimizing a control strategy for the load of the variable frequency air conditioner with a DSR of the power grid. By establishing a mathematical simulation model of a virtual synchronous motor, an output power of the variable frequency air conditioner can simulate an output power and a change process of a rotation speed of a no-load synchronous motor with the same capacity when frequencies of the power grid fluctuates. The power grid adjustment method can improve a moment of inertia of a microgrid and reduce a fluctuation range of AC frequency when a load fluctuates.

Figure 1:
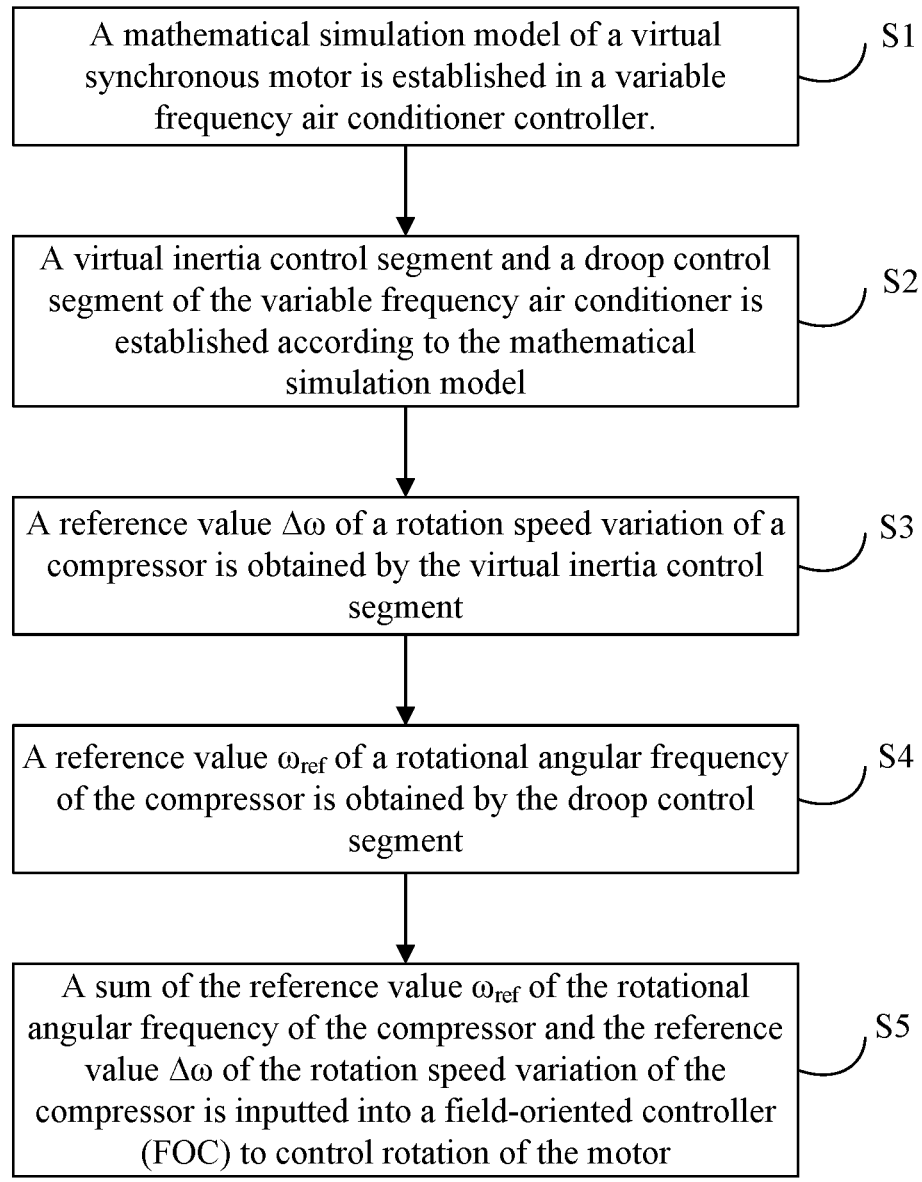
FIG. 1 is a schematic diagram illustrating a power grid adjustment method based on a load of a variable frequency air conditioner provided by an embodiment of the present disclosure.

As shown in FIG. 1, which is a schematic diagram illustrating a power grid adjustment method based on a load of a variable frequency air conditioner provided by the present disclosure, the method includes the following steps.

In S1, a mathematical simulation model of a virtual synchronous motor is established in a variable frequency air conditioner controller.

In S2, a virtual inertia control segment and a droop control segment of the variable frequency air conditioner is established according to the mathematical simulation model.

In S3, a reference value $\Delta\omega$ of rotation speed variation of a compressor is obtained by the virtual inertia control segment.

In S4, a reference value $\omega_{ref}$ of rotational angular frequency of the compressor is obtained by the droop control segment.

In S5, a sum of the reference value $\omega_{ref}$ of rotational angular frequency of the compressor and the reference value $\Delta\omega$ of rotation speed variation of the compressor is inputted into a field-oriented controller (FOC) to control rotation of the motor.

The method further includes the following steps. A signal model of the virtual synchronous motor is established, and a cutoff frequency $\omega_c$ of each variable frequency air conditioner is obtained. A phase margin (PM) of the virtual synchronous motor is acquired, and a moment of inertia J of the virtual synchronous motor is calculated according to the PM and the cutoff frequency $\omega_c$ of the variable frequency air conditioner. A maximum value of the moment of inertia J of the virtual synchronous motor is obtained according to a value range of the PM.

Figure 2:
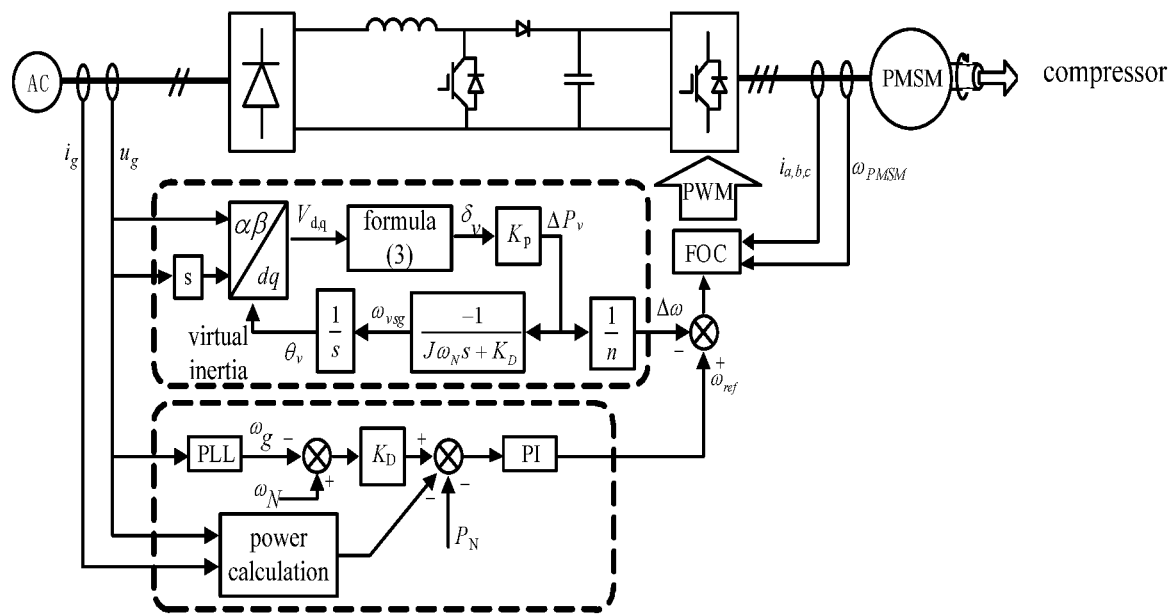
FIG. 2 is a schematic diagram illustrating a control structure of a variable frequency air conditioner based on a virtual motor provided by an embodiment of the present disclosure.

As shown in FIG. 2, it is a schematic diagram illustrating a control structure of the variable frequency air conditioner based on the virtual motor provided by the present disclosure. a voltage $U_g$ of the power grid is collected when a frequency of the power grid changes. The voltage of the power grid is subjected to the virtual inertia control segment to obtain the reference value $\Delta\omega$ of rotation speed variation of the compressor, and meanwhile, the voltage of the power grid is subjected to the droop control segment to obtain the reference value $\omega_{ref}$ of rotational angular frequency of the compressor. Then, the sum of the two is inputted into the FOC for control. A fluctuation range of AC frequencies is reduced when the load fluctuates, and the moment of inertia of the power grid is improved.

The mathematical simulation model is:

$$\begin{cases} J\dfrac{d\Delta\omega_{sg}}{dt} = \dfrac{-K_D\Delta\omega_{sg} - \Delta P_{sg}}{\omega_N} \\ \Delta\delta = \int (\Delta\omega_{sg} - \Delta\omega_g)dt \end{cases};$$

where, J is the moment of inertia of the synchronous motor, $\Delta\omega_{sg}$ is an angular frequency disturbance quantity of the synchronous motor, $\Delta\omega_g$ is an angular frequency disturbance quantity of the voltage of the power grid, $K_D$ is a droop coefficient, $\omega_N$ is a rated rotation speed, $\Delta\delta$ is a power angle disturbance quantity, and $\Delta P_{sg}$ is a power disturbance quantity.

The step of obtaining the reference value $\Delta\omega$ of rotation speed variation of the compressor by the virtual inertia control segment includes the following steps.

The voltage $U_g$ of the power grid is acquired and a virtual voltage orthogonal to the voltage of the power grid is generated by a differential method to form an $\alpha\beta$ static orthogonal coordinate system. A Park transformation is performed with a phase angle $\theta_v$ of a virtual electromotive force vector of the virtual synchronous motor to obtain components of the voltage of the power grid relative to $V_d$ and $V_q$. Then, a power angle $\delta_v$ of the virtual synchronous motor is:

$$\delta_v = \arctan(V_q/V_d);$$

A virtual power $P_v$ of the virtual synchronous motor is:

$$P_v = \frac{U_g E}{X_a} \sin\delta_v \approx \frac{U_g E}{X_a} \delta_v.$$

The reference value $\Delta\omega$ of rotation speed variation of the compressor is:

$$\Delta\omega = \frac{1}{n}\Delta P_v.$$

Where, $U_g$ is the voltage of the power grid, E is the virtual electromotive force, $X_a$ is a virtual reactance, n is a constant, and $\Delta P_v$ is a power consumption variation.

In practical application, the voltage of a power distribution network generally fluctuates between 0.95 and 1.05 times of a rated voltage. Meanwhile, E is a fixed value since a power factor of the variable frequency air conditioner is fixedly and approximately equal to 1.0 under PFC control and cannot participate in adjustment of the voltage of the power grid. Therefore, the constant $K_p = U_g E / X_a$.

A single-phase AC power is an average value within one power frequency period, which has a certain lag for measuring the power. It may be considered that the output power of the variable frequency air conditioner approximately has a linear relationship with a rotation speed of the compressor. In order to make the power of the variable frequency air conditioner rapidly track a reference power of the virtual inertia stage, $\Delta\omega$ may be set as:

$$\Delta\omega = \frac{1}{n}\Delta P_v.$$

The step of obtaining the reference value $\omega_{ref}$ of rotational angular frequency of the compressor by the droop control segment includes the following steps. A constant operating power $P_N$ of the variable frequency air conditioner is acquired according to a set temperature of the variable frequency air conditioner and an indoor temperature. A steady-state output power $P_D$ of the variable frequency air conditioner is calculated by a formula $P_D = P_N + K_D(\omega_N - \omega_g)$, where, $\omega_g$ is an angular frequency of the voltage of the power grid, and $K_D$ is a droop coefficient of the power grid. A difference between an actually measured power of the variable frequency air conditioner and the steady-state output power $P_D$ of the variable frequency air conditioner is inputted into a PI controller to obtain the reference value $\omega_{ref}$ of rotational angular frequency of the compressor.

In summary, the $\Delta\omega$ is added with the $\omega_{ref}$ obtained by the droop control segment, and then the result is inputted into the FOC for a frequency modulation for the voltage.

The step of obtaining the reference value $\omega_{ref}$ of rotational angular frequency of the compressor by the droop control segment further includes the following step(s).

A range of the power of the variable frequency air conditioner is assumed to be $\{0, P_{max}\}$, then an adjustable range of the power is $P_N \pm \min\{(P_{max} - P_N), P_N\}$ during frequency modulation of the power grid, where $P_{max}$ is a maximum power of the variable frequency air conditioner. When a frequency error is 0.3 Hz, the power of the variable frequency air conditioner reaches an upper limit, and the droop coefficient $K_D$ of the power grid is calculated by the following formula:

$$K_D = \frac{0.8 \min\{(P_{max} - P_N), P_N\}}{0.3 \times 2\pi};$$

A small signal model of the virtual synchronous motor is established. An expression of the cutoff frequency $\omega_c$ of each variable frequency air conditioner is obtained by the following formula:

$$\omega_c = \sqrt{\sqrt{\frac{K_p^2}{J^2\omega_N^2} + \frac{K_D^4}{4J^4}} - \frac{K_D^2}{2J^2}}, \; \omega_c \leq \frac{K_p}{\omega_N K_D};$$

When a certain phase angle margin (30° to 50°) is retained, the maximum value of the moment of inertia J is calculated according to the following expression of the PM:

$$PM = 180° + \angle T_p(\omega_c) = 90° - \arctan\left(\frac{\omega_c J}{K_D}\right);$$

where, $\omega_g$ is the angular frequency of the voltage of the power grid, $P_{max}$ is the maximum power of the variable frequency air conditioner, $K_p$ is a constant, and $\angle T_p(\omega_c)$ is a loop gain amplitude of the virtual inertia stage.

Figure 3:
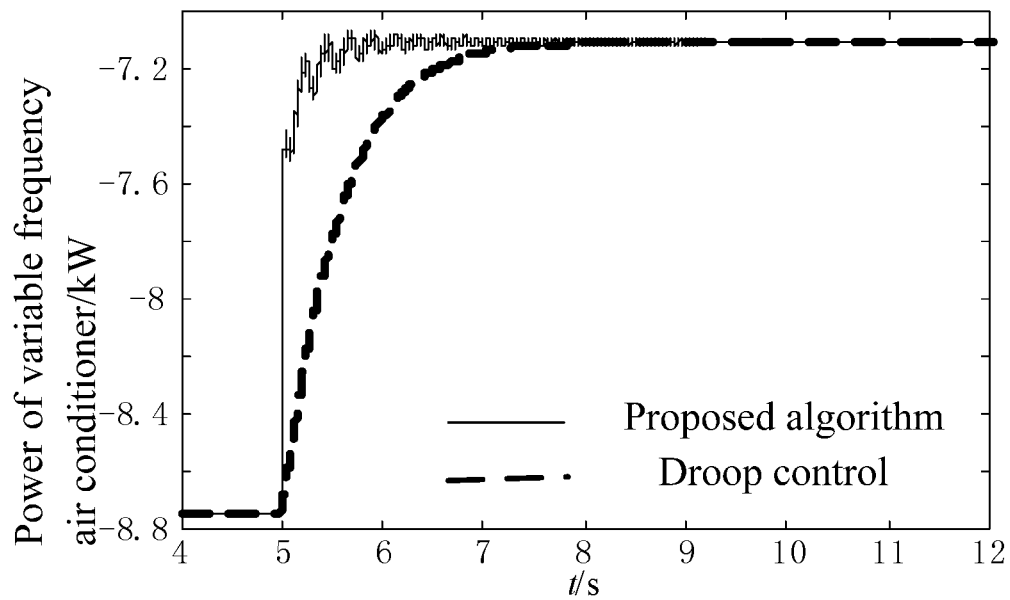
FIG. 3 is a schematic diagram illustrating simulation results of a total power of a single group of variable frequency air conditioners under different control methods provided by an embodiment of the present disclosure.

As shown in FIG. 3, the three-phase AC accesses a system for verification, in which the system includes three groups of variable frequency air conditioners and each group includes seven variable frequency air conditioners. Operating points, droop coefficients and other parameters for each group of variable frequency air conditioners are the same.

It is assumed that a set temperature of each variable frequency air conditioner and a room temperature of an ambient environment are known, and then a rated operating point of each variable frequency air conditioner is obtained, as shown in a second column of Table 1; the droop coefficient $K_D$ is obtained according to the above formula for $K_D$, as shown in a third column of Table 1; and the moment of inertia of each variable frequency air conditioner is obtained by the PM, as shown in a fourth column of Table 1. Table 1 is shown as follows:

TABLE 1

Parameters of the variable frequency air conditioners in one group

| No. | Rated operating point (W) | Droop coefficient (W/(rad/s)) | Moment of inertia (kg · m²) |
| --- | --- | --- | --- |
| 1 | 500 | 212 | 0.122 |
| 2 | 750 | 318 | 0.108 |
| 3 | 1000 | 425 | 0.092 |
| 4 | 1250 | 530 | 0.076 |
| 5 | 1500 | 425 | 0.092 |
| 6 | 1750 | 318 | 0.108 |
| 7 | 2000 | 212 | 0.122 |

Figure 4:
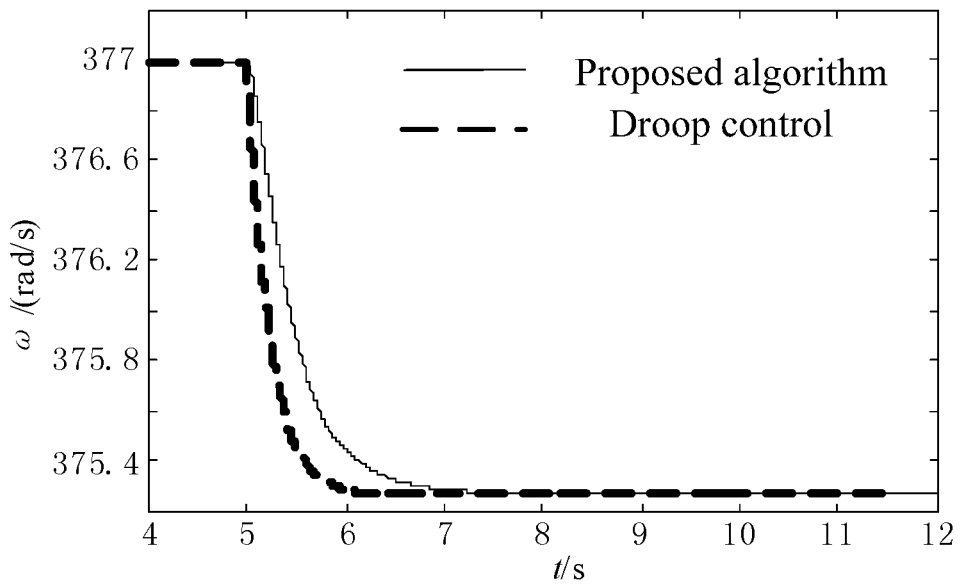
FIG. 4 is a schematic diagram illustrating simulation results of frequencies of a power grid under different control methods provided by an embodiment of the present disclosure.

In practical application, the variable frequency air conditioners can be controlled by a normal droop control or the method of the present application when the load fluctuates. FIG. 3 and FIG. 4 show simulation results of dynamic processes of the system of the variable frequency air conditioners under the normal droop control and the proposed control strategy respectively when the load fluctuates. It should be illustrated that the proposed algorithms illustrated in FIG. 3 and FIG. 4 are the load control of the variable frequency air conditioner based on the virtual synchronous motor. It can be seen from FIG. 3 that at the moment of impact loads accessing a speed of the power reducing of the variable frequency air conditioner is faster than that under the control strategy proposed in droop control, and a power imbalance of the microgrid is reduced more rapidly. It can be seen from FIG. 4 that a frequency drop rate of the microgrid is greatly slowed down after applying the proposed control strategy.

Figure 5:
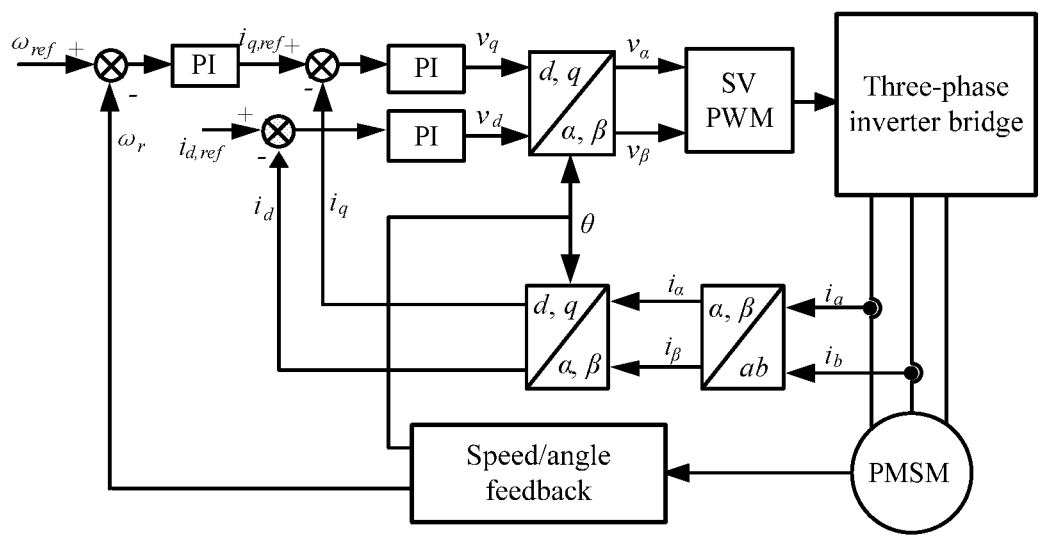
FIG. 5 is a schematic diagram illustrating a structure of a field-oriented controller (FOC) provided by an embodiment of the present disclosure.

As shown in FIG. 5, which is a schematic diagram illustrating a structure of the FOC provided by the present disclosure A working process of the FOC is as follows.

In step 1, two-phase currents $i_a$ and $i_b$ are collected at first.

In step 2, a clarke transformation is performed to obtain two-axis orthogonal current magnitudes $i_\alpha$ and $i_\beta$.

In step 3, a rotation transformation is performed to obtain orthogonal current magnitudes $i_d$ and $i_q$, where $i_q$ is related to a torque and $i_d$ is related to a magnetic flux. In an actual control, $i_d$ is often set as zero. the two obtained magnitudes are not time-varying, so the two magnitudes can be controlled separately, which is similar to a direct current (DC) quantity control. However, It is unnecessary to know the specific voltages applied to the three phases of the motor.

In step 4, the magnitudes $i_d$ and $i_q$ obtained in the step 3 are respectively sent into a PI adjuster to obtain the corresponding outputs $v_d$ and $v_q$.

In step 5, a rotation angle of the motor is obtained by a sensor.

In step 6, an inverse park transformation is performed to obtain two-axis current magnitudes $v_\alpha$ and $v_\beta$.

In step 7, an inverse clarke transformation is performed on $v_\alpha$ and $v_\beta$ in the step 6 to obtain a three-phase voltage required actually for being inputted to an inverter bridge to drive the motor to rotate.

According to a technical solution of the present embodiment, when the frequency of the power grid fluctuates, the output power of the variable frequency air conditioner can simulate a change process of the output power and the rotation speed of a by establishing the mathematical simulation model of the virtual synchronous motor with the same capacity as the no-load synchronous motor. The solution can be adopted to solve the problem of insufficient moment of inertia of the power grid caused after a new energy resource accesses to the power grid. Thus, the moment of inertia of the microgrid can be improved, and the fluctuation range of AC frequency can be reduced when the load fluctuates.

Figure 6:
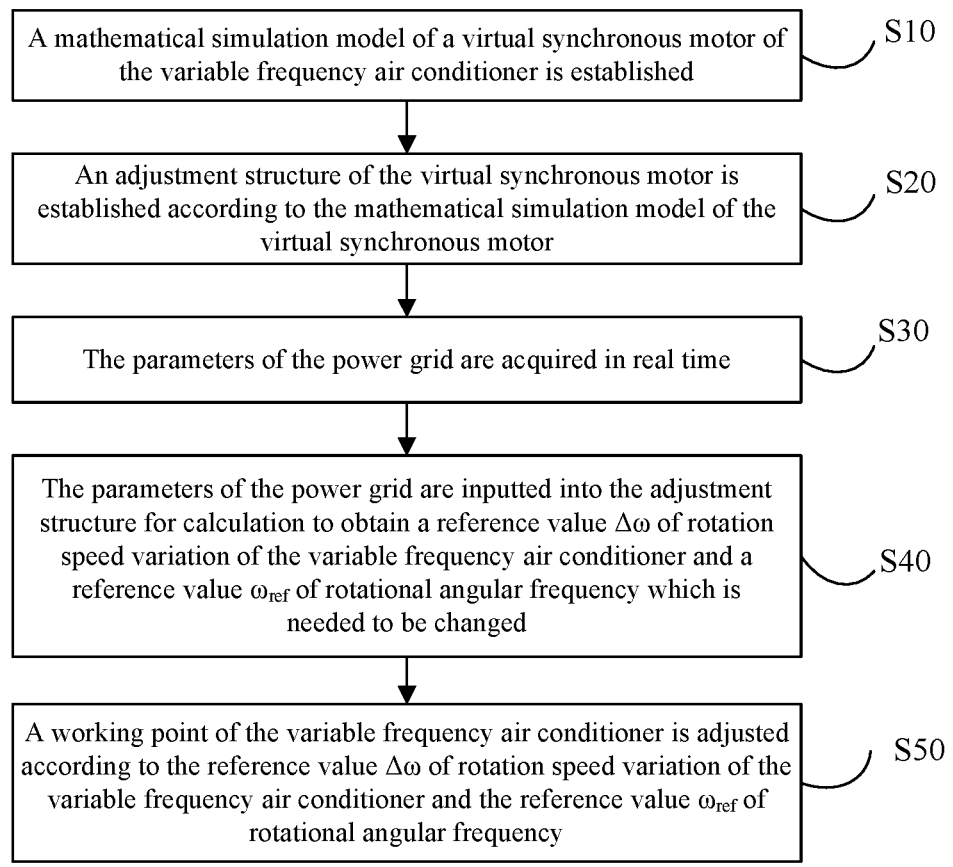
FIG. 6 is a schematic diagram illustrating another power grid adjustment method based on the load of the variable frequency air conditioner provided by an embodiment of the present disclosure.

Embodiments of the present disclosure further provide a power grid adjustment method based on a load of a variable frequency air conditioner. FIG. 6 is a schematic diagram illustrating another power grid adjustment method based on the load of the variable frequency air conditioner provided by an embodiment of the present disclosure. As shown in FIG. 6, the method includes the following steps.

In S10, a mathematical simulation model of a virtual synchronous motor of the variable frequency air conditioner is established.

In S20, an adjustment structure of the virtual synchronous motor is established according to the mathematical simulation model of the virtual synchronous motor.

With reference to FIG. 2, the adjustment structure may be a virtual inertia control segment and a droop control segment. An inertia adjustment proportion parameter of the virtual inertia control segment and a droop adjustment proportion parameter of the droop control segment can be determined according to the mathematical simulation model of the virtual $$J\frac{d\Delta\omega_{sg}}{dt} = \frac{-K_D\Delta\omega_{sg} - \Delta P_{sg}}{\omega_N} \quad (1)$$

synchronous motor. For example, in of the mathematical simulation model of the virtual synchronous motor, $\Delta P_{sg}$ is a power disturbance quantity of the power grid and measured by the power grid in real time. When the frequency of the power grid changes, the power disturbance quantity $\Delta P_{sg}$ of the power grid is measured. It can be known from formula (1) that the power disturbance quantity $\Delta P_{sg}$ of the power grid includes two parts: one part is a product of $K_D\Delta\omega_{sg}$ which is expressed as the droop control segment of the adjustment structure, and the other part is $$J\frac{d\Delta\omega_{sg}}{dt}$$

which is expressed as the virtual inertia control segment. Therefore, the adjustment structure of the virtual synchronous motor can be established according to the mathematical simulation model of the virtual synchronous motor. In general, the formula (1) is represented in the adjustment structure by determining the parameters in the adjustment structure. For example, a first-order system parameter in the virtual inertia control segment is determined by J in the mathematical simulation model of the virtual synchronous motor, and a droop coefficient in the droop control segment is determined by $K_D$ of the mathematical simulation model of the virtual synchronous motor.

In S30, the parameters of the power grid are acquired in real time.

With reference to FIG. 2, the adjustment structure acquires a real-time frequency, a voltage, a current and the like of the power grid from the power grid before calculation, thereby determining frequency change of the power grid and the power acquired by the variable frequency air conditioner from the power grid in real time.

In S40, the parameters of the power grid are inputted into the adjustment structure for calculation to obtain a reference value $\Delta\omega$ of rotation speed variation of the variable frequency air conditioner and a reference value $\omega_{ref}$ of rotational angular frequency which is needed to be changed.

With reference to FIG. 2, the parameters of the power grid may be inputted into the adjustment structure for calculation to obtain the reference value $\Delta\omega$ of rotation speed variation of the variable frequency air conditioner and the reference value $\omega_{ref}$ of rotational angular frequency which is needed to be changed after determining the parameters in the virtual inertia control segment and the droop control segment of the adjustment structure and acquiring the parameters of the power grid in real time. In an exemplary embodiment, the voltage of the power grid is inputted into the virtual inertia control segment for calculation to obtain the reference value $\Delta\omega$ of rotation speed variation of the variable frequency air conditioner, and the frequency of the power grid is inputted into the droop control segment for calculation to obtain the reference value $\omega_{ref}$ of rotational angular frequency which is needed to be changed.

In S50, a working point of the variable frequency air conditioner is adjusted according to the reference value $\Delta\omega$ of rotation speed variation of the variable frequency air conditioner and the reference value $\omega_{ref}$ of rotational angular frequency.

With reference to FIG. 2, an angular frequency value needed to be adjusted is obtained by a difference value between the reference value $\Delta\omega$ of rotation speed variation of the variable frequency air conditioner and the reference value $\omega_{ref}$ of rotational angular frequency, and the angular frequency value is inputted into the FOC for controlling a PWM circuit, so as to adjust the working point of the variable frequency air conditioner. Thus, the working point of the variable frequency air conditioner is adaptively adjusted according to changes of the parameters of the power grid. When the frequency of the power grid is reduced, the variable frequency air conditioner adaptively reduces the working frequency to reduce the power acquired from the power grid, further to reduce the moment of inertia acquired by the variable frequency air conditioner from the power grid and reduce the fluctuation range of the frequency of the power grid when the power grid fluctuates.

Before the mathematical simulation model of the virtual synchronous motor of the variable frequency air conditioner is established, the method further includes the following steps. A signal model of the virtual synchronous motor is established, and a cutoff frequency $\omega_c$ of each variable frequency air conditioner is obtained; a PM of the virtual synchronous motor is acquired, and a moment of inertia J of the virtual synchronous motor is calculated according to the PM and the cutoff frequency $\omega_c$ of the variable frequency air conditioner; and a maximum value of the moment of inertia J of the virtual synchronous motor is obtained according to a value range of the PM.

The mathematical simulation model of the virtual synchronous motor can be conveniently calculated by determining the value range of the moment of inertia J of the virtual synchronous motor before establishing the mathematical simulation model of the virtual synchronous motor of the variable frequency air conditioner.

The mathematical simulation model is:

$$\begin{cases} J\dfrac{d\Delta\omega_{sg}}{dt} = \dfrac{-K_D\Delta\omega_{sg} - \Delta P_{sg}}{\omega_N} \\ \Delta\delta = \int (\Delta\omega_{sg} - \Delta\omega_g)dt \end{cases},$$

$\Delta\omega_{sg}$ is an angular frequency disturbance quantity of the virtual synchronous motor, $\Delta\omega_g$ is an angular frequency disturbance quantity of a voltage of the power grid, $K_D$ is a droop coefficient, $\omega_N$ is a rated rotation speed, $\Delta\delta$ is a power angle disturbance quantity, $\Delta P_{sg}$ is a power disturbance quantity, and J is the moment of inertia of the virtual synchronous motor.

The step of inputting the voltage of the power grid into the virtual inertia control segment for calculation to obtain the reference value $\Delta\omega$ of rotation speed variation of the variable frequency air conditioner includes the following steps.

The voltage $U_g$ of the power grid is acquired and a virtual voltage orthogonal to the voltage of the power grid is generated by a differential method to form an $\alpha\beta$ static orthogonal coordinate system. A Park transformation is performed with a phase angle $\theta_v$ of a virtual electromotive force vector of the virtual synchronous motor to obtain components of the voltage of the power grid relative to $V_d$ and $V_q$. Then, a power angle $\delta_v$ of the virtual synchronous motor is:

$\delta_v = \arctan(V_q/V_d).$

A virtual power $P_v$ of the virtual synchronous motor is:

$$P_v = \frac{U_g E}{X_a}\sin\delta_v \approx \frac{U_g E}{X_a}\delta_v$$

The reference value $\Delta\omega$ of rotation speed variation of the compressor is:

$$\Delta\omega = \frac{1}{n}\Delta P_v.$$

Where, $U_g$ is the voltage of the power grid, E is the virtual electromotive force, $X_a$ is a virtual reactance, n is a constant, and $\Delta P_v$ is a power consumption variation.

In practical application, the voltage of a power distribution network generally fluctuates between 0.95 and 1.05 times of a rated voltage. Meanwhile, E is a fixed value since a power factor of the variable frequency air conditioner is fixedly and approximately equal to 1.0 under PFC control and cannot participate in adjustment of the voltage of the power grid. Therefore, the constant $K_p = U_g E/X_a$.

A single-phase AC power is an average value within one power frequency period, which has a certain lag for measuring the power. It may be considered that the output power of the variable frequency air conditioner approximately has a linear relationship with a rotation speed of the compressor. In order to make the power of the variable frequency air conditioner rapidly track a reference power of the virtual inertia stage, $\Delta\omega$ may be set as:

$$\Delta\omega = \frac{1}{n}\Delta P_v.$$

The step of inputting the frequency of the power grid into the droop control segment for calculation to obtain the reference value $\omega_{ref}$ of rotational angular frequency to be changed includes the following steps. A constant operating power $P_N$ of the variable frequency air conditioner is acquired according to a set temperature of the variable frequency air conditioner and an indoor temperature. A steady-state output power $P_D$ of the variable frequency air conditioner is calculated by a formula $P_D = P_N \pm K_D(\omega_N - \omega_g)$, where, $\omega_g$ is an angular frequency of the voltage of the power grid, and $K_D$ is a droop coefficient of the power grid. A difference value between an actually measured power of the variable frequency air conditioner and the steady-state output power $P_D$ of the variable frequency air conditioner is inputted into a PI controller to obtain the reference value $\omega_{ref}$ of rotational angular frequency of the compressor.

Specifically, before the frequency of the power grid is inputted into the droop control stage for calculation to obtain the reference value $\omega_{ref}$ of rotational angular frequency which is needed to be changed, the method further includes: obtaining the droop coefficient of the droop control stage. The droop coefficient $K_D$ is:

$$K_D = \frac{0.8\ \min\{(P_{max} - P_N), P_N\}}{0.3 \times 2\pi};$$

where, $P_{max}$ is a maximum power of the variable frequency air conditioner, $P_N$ is a rated power of the variable frequency air conditioner, and an adjustable range of the power of the variable frequency air conditioner is $P_N \pm \min\{(P_{max}-P_N), P_N\}$.

The cutoff frequency $\omega_c$ of the variable frequency air conditioner is:

$$\omega_c = \sqrt{\sqrt{\frac{K_p^2}{J^2\omega_N^2} + \frac{K_D^4}{4J^4}} - \frac{K_D^2}{2J^2}}, \omega_c \leq \frac{K_p}{\omega_N K_D};$$

where $K_p$ is a constant.

A relationship between a value range of the PM and the maximum value of the moment of inertia J of the virtual synchronous motor is:

$$PM = 180° + \angle T_p(\omega_c) = 90° - \arctan\left(\frac{\omega_c J}{K_D}\right);$$

where, PM is the phase margin, and $\angle T_p(\omega_c)$ is a loop gain amplitude of the virtual inertia stage.

As shown in FIG. 3, the three-phase AC accesses a system for verification, in which the system includes three groups of variable frequency air conditioners and each group includes seven variable frequency air conditioners. Operating points, droop coefficients and other parameters for each group of variable frequency air conditioners are the same.

It is assumed that a set temperature of each variable frequency air conditioner and a room temperature of an ambient environment are known, and then a rated operating point of each variable frequency air conditioner is obtained, with continued reference to Table 1, as shown in a second column of Table 1; the droop coefficient $K_D$ is obtained according to the above formula for $K_D$, as shown in a third column of Table 1; and the moment of inertia of each variable frequency air conditioner is calculated and obtained by the PM, as shown in a fourth column of Table 1.

In practical application, the variable frequency air conditioners can be controlled by a normal droop control or the method of the present application when the load fluctuates. FIG. 3 and FIG. 4 show simulation results of dynamic processes of the system of the variable frequency air conditioners under the normal droop control and the proposed control strategy respectively when the load fluctuates. It should be illustrated that, FIG. 3 is a schematic diagram illustrating the simulation results of a total power of a single group of variable frequency air conditioners under different control methods provided by embodiments of the present invention, and FIG. 4 is a schematic diagram illustrating the simulation results of the frequency of the power grid under different control methods provided by embodiments of the present invention. The proposed algorithm illustrated in FIG. 3 and FIG. 4 are an algorithm for the load control of the variable frequency air conditioner based on the virtual synchronous motor. It can be seen from FIG. 3 that at the moment of impact loads accessing a speed of the power reducing of the variable frequency air conditioner is faster than that under the control strategy proposed in droop control, and a power imbalance of the power grid is reduced more rapidly. It can be seen from FIG. 4 that a frequency drop rate of the power grid is greatly slowed down after applying the proposed control strategy.

As shown in FIG. 5, which is a schematic diagram illustrating a structure of the FOC provided by an embodiment of the present invention, a working process of the FOC is as follows. The working point of the variable frequency air conditioner is adjusted according to the reference value $\Delta\omega$ of rotation speed variation of the variable frequency air conditioner and the reference value $\omega_{ref}$ of rotational angular frequency, and this step includes the following steps.

Two-phase currents $i_a$ and $i_b$ of the variable frequency air conditioner are collected.

The clarke transformation is performed on the two-phase currents $i_a$ and $i_b$ to obtain two-axis orthogonal current magnitudes $i_\alpha$ and $i_\beta$.

The rotation transformation is performed on the orthogonal current magnitudes $i_\alpha$ and $i_\beta$ to obtain orthogonal current magnitudes $i_d$ and $i_q$, where $i_q$ is related to a torque and $i_d$ is related to a magnetic flux.

The obtained $i_d$ and $i_q$ are respectively inputted into the PI controller to obtain corresponding outputs $v_d$ and $v_q$.

A rotation angle $\theta$ of the motor of the variable frequency air conditioner is obtained by a sensor, and the inverse park transformation is performed with $v_d$ and $v_q$ to obtain two-axis current magnitudes $v_\alpha$ and $v_\beta$.

The inverse clarke transformation is performed on $v_\alpha$ and $v_\beta$ to obtain the required three-phase voltage for being inputted to an inverter bridge to drive the variable frequency air conditioner to work.

According to a technical solution of the present embodiment, when the frequency of the power grid fluctuates, the output power of the variable frequency air conditioner can simulate a change process of the output power and the rotation speed of a no-load synchronous motor by establishing the mathematical simulation model of the virtual synchronous motor with the same capacity as the no-load synchronous motor. The solution can be adopted to solve the problem of insufficient moment of inertia of the power grid caused after a new energy resource accesses to the power grid. Thus, the moment of inertia of the microgrid can be improved, and the fluctuation range of AC frequency can be reduced when the load fluctuates.

It should be noted that, the above only describes preferred embodiments of the present disclosure and applied technical principles. Those skilled in the art shall understand that the present disclosure is not limited to specific embodiments described herein. For those skilled in the art, various apparent variations, readjustments and replacements can be made without departing from a protection scope of the present disclosure. Therefore, although the present disclosure is described in detail through the above embodiments, the present disclosure is not limited to the above embodiments and may further include more other equivalent embodiments without departing from the concept of the present disclosure, while the scope of the present disclosure is decided by a scope of attached claims.

What is claimed is:

1. A power grid adjustment method based on a load of a variable frequency air conditioner, comprising:
    establishing a mathematical simulation model of a virtual synchronous motor in the variable frequency air conditioner controller;
    establishing a virtual inertia control segment and a droop control segment of power grid adjustment according to the mathematical simulation model;
    obtaining a reference value $\Delta\omega$ of a rotation speed variation of a compressor by the virtual inertia control segment;
    obtaining a reference value $\omega_{ref}$ of a rotational angular frequency of the compressor by the droop control segment; and inputting a sum of the reference value $\omega_{ref}$ of the rotational angular frequency of the compressor and the reference value $\Delta\omega$ of the rotation speed variation of the compressor into a field-oriented controller to control a rotation of the motor.

2. The power grid adjustment method according to claim 1, further comprising:
establishing a signal model of the virtual synchronous motor, and obtaining a cutoff frequency $\omega_c$ of each variable frequency air conditioner;
acquiring a phase margin (PM) of the virtual synchronous motor, and calculating a moment of inertia J of the virtual synchronous motor according to the PM and the cutoff frequency $\omega_c$ of the variable frequency air conditioner; and
obtaining a maximum value of the moment of inertia J of the virtual synchronous motor according to a value range of the PM.

3. The power grid adjustment method according to claim 2, wherein the mathematical simulation model is $$\begin{cases} J\dfrac{d\Delta\omega_{sg}}{dt} = \dfrac{-K_D\Delta\omega_{sg} - \Delta P_{sg}}{\omega_N} \\ \Delta\delta = \int(\Delta\omega_{sg} - \Delta\omega_g)dt \end{cases},$$

wherein $\Delta\omega_{sg}$ is an angular frequency disturbance quantity of the virtual synchronous motor, $\Delta\omega_g$ is an angular frequency disturbance quantity of a voltage of the power grid, $K_D$ is a droop coefficient, $\omega_N$ is a rated rotation speed, $\Delta\omega$ is a power angle disturbance quantity, and $\Delta P_{sg}$ is a power disturbance quantity.

4. The power grid adjustment method according to claim 3, wherein the step of obtaining a reference value $\Delta\omega$ of a rotation speed variation of a compressor by the virtual inertia control segment comprises:
acquiring the voltage $U_g$ of the power grid and generating a virtual voltage orthogonal to the voltage of the power grid by a differential method to form an $\alpha\beta$ static orthogonal coordinate system, and performing a Park transformation with a phase angle $\theta$ of a virtual electromotive force vector of the virtual synchronous motor to obtain components of the voltage of the power grid relative to $V_d$ and $V_q$; and then,
a power angle $\delta_v$ of the virtual synchronous motor is:
$\delta_v = \arctan(V_q/V_d)$;
a virtual power $P_v$ of the virtual synchronous motor is:

$$P_v = \dfrac{U_g E}{X_a}\sin\delta_v \approx \dfrac{U_g E}{X_a}\delta_v;$$

the reference value $\Delta\omega$ of the rotation speed variation of the compressor is:

$$\Delta\omega = \dfrac{1}{N}\Delta P_v,$$

wherein $U_g$ is the voltage of the power grid, E is the virtual electromotive force, $X_a$ is a virtual reactance, $\Delta P_v$ is a power consumption variation, and n is a non-zero real constant indicating a linear relation between the reference value $\Delta\omega$ and the power consumption variation $\Delta P_v$.

5. The power grid adjustment method according to claim 4, wherein the step of obtaining a reference value $\omega_{ref}$ of a rotational angular frequency of the compressor by the droop control segment comprises:
acquiring a constant operating power $P_N$ of the variable frequency air conditioner according to a set temperature of the variable frequency air conditioner and an indoor temperature, and calculating by a formula $P_D=P_N+K_D(\omega_N-\omega_g)$ to obtain a steady-state output power $P_D$ of the variable frequency air conditioner, wherein $\omega_g$ is an angular frequency of the voltage of the power grid, and $K_D$ is a droop coefficient of the power grid; and
inputting a difference between an actually measured power of the variable frequency air conditioner and the steady-state output power $P_D$ of the variable frequency air conditioner into a PI controller to obtain the reference value $\omega_{ref}$ of the rotational angular frequency of the compressor.

6. The power grid adjustment method according to claim 5, wherein the step of obtaining a reference value $\omega_{ref}$ of a rotational angular frequency of the compressor by the droop control segment further comprises:
setting a range of the power of the variable frequency air conditioner as $\{0, P_{max}\}$, then an adjustable range of the power is $P_N \pm \min\{(P_{max}-P_N), P_N\}$ during a frequency modulation of the power grid, where, $P_{max}$ is a maximum power of the variable frequency air conditioner, and the power of the variable frequency air conditioner reaches an upper limit when a frequency error is 0.3 Hz; and
calculating the droop coefficient $K_D$ of the power grid by a formula:

$$K_D = \dfrac{0.8 \min\{(P_{max} - P_N), P_N\}}{0.3 \times 2\pi}.$$

7. The power grid adjustment method according to claim 6, further comprising:

$$\omega_c = \sqrt{\sqrt{\dfrac{K_p^2}{J^2\omega_N^2} + \dfrac{K_D^4}{4J^4}} - \dfrac{K_D^2}{2J^2}}, \; \omega_c \leq \dfrac{K_p}{\omega_N K_D}$$

obtaining the cutoff frequency $\omega_c$ of each variable frequency air conditioner by the above formula, where $K_p$ is a constant;

$$PM = 180° + \angle T_p(\omega_c) = 90° - \arctan\left(\dfrac{\omega_c J}{K_D}\right)$$

calculating to obtain a maximum value of the moment of inertia J according to the above formula of the PM when the PM is in a range of 30° to 50°, where $\angle T_p(\omega_c)$ is a loop gain amplitude of a virtual inertia stage.

8. The power grid adjustment method according to claim 7, wherein the step of inputting a sum of the reference value $\omega_{ref}$ of the rotational angular frequency of the compressor and the reference value $\Delta\omega$ of the rotation speed variation of the compressor into a field-oriented controller to control a rotation of the motor comprises:

collecting two-phase currents $i_a$ and $i_b$;

performing clarke transformation on the two-phase currents $i_a$ and $i_b$ to obtain magnitudes of two-axis orthogonal currents $i_\alpha$ and $i_\beta$;

performing rotation transformation on the magnitudes of the orthogonal currents $i_\alpha$ and $i_\beta$ to obtain orthogonal current magnitudes $i_d$ and $i_q$, wherein $i_q$ is related to a torque, and $i_d$ is related to a magnetic flux;

inputting the obtained $i_d$ and $i_q$ respectively into the PI controller to obtain corresponding outputs $v_d$ and $v_q$;

obtaining a rotation angle θ of the motor by a sensor, and performing an inverse park transformation with $v_d$ and $v_q$ to obtain magnitudes of two-axis currents $v_\alpha$ and $v_\beta$; and performing an inverse clarke transformation on $v_\alpha$ and $v_\beta$ to obtain a required three-phase voltage, and inputting the three-phase voltage to an inverter bridge to drive the motor to rotate.

9. A power grid adjustment method based on a load of a variable frequency air conditioner, comprising:

establishing a mathematical simulation model of a virtual synchronous motor of the variable frequency air conditioner;

establishing an adjustment structure of the virtual synchronous motor according to the mathematical simulation model of the virtual synchronous motor;

acquiring parameters of a power grid in real time;

inputting the parameters of the power grid into the adjustment structure for calculation to obtain a reference value Δω of a rotation speed variation of the variable frequency air conditioner and a reference value $\omega_{ref}$ of a rotational angular frequency of the variable frequency air conditioner; and adjusting a working point of the variable frequency air conditioner according to the reference value Δω of the rotation speed variation of the variable frequency air conditioner and the reference value $\omega_{ref}$ of the rotational angular frequency.

10. The method according to claim 9, wherein before the step of establishing a mathematical simulation model of a virtual synchronous motor of a variable frequency air conditioner, the method further comprises:

establishing a signal model of the virtual synchronous motor, and obtaining a cutoff frequency $\omega_c$ of each variable frequency air conditioner;

acquiring a phase margin (PM) of the virtual synchronous motor, and calculating a moment of inertia J of the virtual synchronous motor according to the PM and the cutoff frequency $\omega_c$ of the variable frequency air conditioner; and obtaining a maximum value of the moment of inertia J of the virtual synchronous motor according to a value range of the PM.

11. The method according to claim 10, wherein the mathematical simulation model is:

$$\begin{cases} J\dfrac{d\Delta\omega_{sg}}{dt} = \dfrac{-K_D\Delta\omega_{sg} - \Delta P_{sg}}{\omega_N} \\ \Delta\delta = \int (\Delta\omega_{sg} - \Delta\omega_g)dt \end{cases};$$

wherein $\Delta w_{sg}$ is an angular frequency disturbance quantity of the virtual synchronous motor, $\Delta w_g$ is an angular frequency disturbance quantity of a voltage of the power grid, $K_D$ is a droop coefficient, $\omega_N$ is a rated rotation speed, Δδ is a power angle disturbance quantity, $\Delta P_{sg}$ is a power disturbance quantity, and J is the moment of inertia of the virtual synchronous motor.

12. The method according to claim 11, wherein the adjustment structure comprises a virtual inertia control segment and a droop control segment; and the step of establishing an adjustment structure of the virtual synchronous motor according to the mathematical simulation model of the virtual synchronous motor comprises:

determining an inertia adjustment proportion parameter of the virtual inertia control segment and a droop adjustment proportion parameter of the droop control segment according to the mathematical simulation model of the virtual synchronous motor.

13. The method according to claim 12, wherein the step of inputting the parameters of the power grid into the adjustment structure for calculation to obtain a reference value Δω of a rotation speed variation of the variable frequency air conditioner and a reference value $\omega_{ref}$ of a rotational angular frequency of the variable frequency air conditioner comprises:

inputting a voltage of the power grid into the virtual inertia control segment for calculation to obtain the reference value Δω of the rotation speed variation of the variable frequency air conditioner; and inputting a frequency of the power grid into the droop control segment for calculation to obtain the reference value $\omega_{ref}$ of the rotational angular frequency of the variable frequency air conditioner.

14. The method according to claim 13, wherein the step of inputting the voltage of the power grid into the virtual inertia control segment for calculation to obtain the reference value Δω of the rotation speed variation of the variable frequency air conditioner comprises:

acquiring the voltage $U_g$ of the power grid and generating a virtual voltage orthogonal to the voltage of the power grid by a differential method to form an αβ static orthogonal coordinate system, and performing a Park transformation with a phase angle $\theta_v$ of a virtual electromotive force vector of the virtual synchronous motor to obtain components of the voltage of the power grid relative to $V_d$ and $V_q$; and then, a power angle $\delta_v$ of the virtual synchronous motor is:

$$\delta_v = \arctan(V_q/V_d);$$

a virtual power $P_v$ of the virtual synchronous motor is:

$$P_v = \frac{U_g E}{X_a}\sin\delta_v \approx \frac{U_g E}{X_a}\delta_v;$$

the reference value Δω of the rotation speed variation of a compressor is:

$$\Delta\omega = \frac{1}{n}\Delta P_v,$$

wherein $U_g$ is the voltage of the power grid, E is the virtual electromotive force, $X_a$ is a virtual reactance, $\Delta P_v$ is a power consumption variation, and n is a non-zero real constant indicating a linear relation between the reference value Δω and the power consumption variation $\Delta P_v$.

15. The method according to claim 13, wherein the step of inputting the frequency of the power grid into the droop control segment for calculation to obtain the reference value $\omega_{ref}$ of the rotational angular frequency of the variable frequency air conditioner which is needed to be changed comprises:

acquiring a constant operating power $P_N$ of the variable frequency air conditioner according to a set temperature of the variable frequency air conditioner and an indoor temperature, and calculating by a formula $P_D=P_N+K_D(\omega_N-\omega_g)$ to obtain a steady-state output power $P_D$ of the variable frequency air conditioner, wherein $\omega_g$ is an angular frequency of the voltage of the power grid, and $K_D$ is a droop coefficient of the power grid; and inputting a difference between an actually measured power of the variable frequency air conditioner and the steady-state output power $P_D$ of the variable frequency air conditioner into a PI controller to obtain the reference value $\omega_{ref}$ of the rotational angular frequency of a compressor.

16. The method according to claim 15, wherein before inputting the frequency of the power grid into the droop control segment for calculation to obtain the reference value $\omega_{ref}$ of the rotational angular frequency of the variable frequency air conditioner, the method further comprises:
acquiring the droop coefficient of the droop control segment;
the droop coefficient $K_D$ is:

$$K_D = \frac{0.8 \min\{(P_{max}-P_N), P_N\}}{0.3\times 2\pi}.$$

wherein $P_{max}$ is a maximum power of the variable frequency air conditioner, $P_N$ is a rated power of the variable frequency air conditioner, and an adjustable range of the power of the variable frequency air conditioner is $P_N\pm\min\{(P_{max}-P_N), P_N\}$.

17. The method according to claim 13, wherein the cutoff frequency $\omega_c$ of the variable frequency air conditioner is:

$$\omega_c = \sqrt{\sqrt{\frac{K_p^2}{J^2\omega_N^2}+\frac{K_D^4}{4J^4}}-\frac{K_D^2}{2J^2}}, \omega_c \leq \frac{K_p}{\omega_N K_D};$$

where Kp is a constant.

18. The method according to claim 17, wherein a relationship between a value range of the PM and the maximum value of the moment of inertia J of the virtual synchronous motor is:

$$PM = 180° + \angle T_p(\omega_c) = 90° - \arctan\left(\frac{\omega_c J}{K_D}\right);$$

wherein PM is the phase margin, and $\angle T_p(\omega_c)$ is a loop gain amplitude of a virtual inertia stage.

19. The method according to claim 9, wherein the step of adjusting a working point of the variable frequency air conditioner according to the reference value $\Delta\omega$ of the rotation speed variation of the variable frequency air conditioner and the reference value $\omega_{ref}$ of the rotational angular frequency comprises:

collecting two-phase currents $i_a$ and $i_b$ of the variable frequency air conditioner;

performing clarke transformation on the two-phase currents $i_a$ and $i_b$ to obtain magnitudes of two-axis orthogonal currents $i_\alpha$ and $i_\beta$;

performing rotation transformation on the magnitudes of the orthogonal currents $i_\alpha$ and $i_\beta$ to obtain orthogonal current magnitudes $i_d$ and $i_q$, where, $i_q$ is related to a torque, and $i_d$ is related to a magnetic flux;

inputting the obtained $i_d$ and $i_q$ respectively into the PI controller to obtain corresponding outputs $v_d$ and $v_q$;

obtaining a rotation angle $\theta$ of the motor of the variable frequency air conditioner by a sensor, and performing an inverse park transformation with $v_d$ and $v_q$ to obtain magnitudes of two-axis currents $v_\alpha$ and $v_\beta$; and performing an inverse clarke transformation on $v_\alpha$ and $v_\beta$ to obtain a required three-phase voltage, and inputting the three-phase voltage to an inverter bridge to drive the variable frequency air conditioner to work.

* * * * *